United States Patent [19]

Braunlich et al.

[11] Patent Number: 4,776,561

[45] Date of Patent: Oct. 11, 1988

[54] TRIGGER CONTROL FOR AIR TOOL HANDLE

[75] Inventors: Mark F. Braunlich, Mentor; Hugh L. Whitehouse, Lyndhurst, both of Ohio

[73] Assignee: The Stanley Works, New Britain, Conn.

[21] Appl. No.: 938,646

[22] Filed: Dec. 5, 1986

[51] Int. Cl.[4] .......... F16K 31/122

[52] U.S. Cl. .......... 251/39; 91/461; 173/169

[58] Field of Search .......... 91/461; 173/169; 251/39

[56] References Cited

U.S. PATENT DOCUMENTS

| | | | |
|---|---|---|---|
| 787,347 | 4/1905 | Templin | 173/169 X |
| 1,112,564 | 10/1914 | Schroeder | 251/39 |
| 2,426,941 | 9/1947 | Mercier | 251/39 |
| 2,831,465 | 4/1958 | Perry | 251/39 X |
| 3,323,602 | 6/1967 | Lysell | 173/169 |
| 3,326,240 | 8/1964 | McConnaughay . | |
| 3,666,027 | 5/1972 | Sauerwein et al. . | |
| 3,718,313 | 2/1973 | Miller . | |
| 3,924,693 | 12/1975 | Whitehouse . | |
| 3,983,947 | 10/1976 | Wills et al. . | |
| 4,258,799 | 3/1981 | Eckman . | |

FOREIGN PATENT DOCUMENTS 654823 12/1937 Fed. Rep. of Germany .

*Primary Examiner*—Gerald A. Michalsky

*Attorney, Agent, or Firm*—Hayes & Reinsmith

[57] ABSTRACT

A trigger for a fluid operated tool has a control with a pilot valve which when open pressurizes a chamber to cause a throttle valve to open. When closed, the pilot valve restricts fluid flow and reduces fluid pressure in the chamber, permitting the throttle valve to be closed. A continuously variable trigger control is also featured for varying the fluid flow rate to the tool.

5 Claims, 3 Drawing Sheets

TRIGGER CONTROL FOR AIR TOOL HANDLE

BACKGROUND OF THE INVENTION

This invention relates to a trigger control for an air powered tool.

The prior art is replete with examples of trigger controls for hand operated air powered tools. These trigger controls are generally meant to be operated by either the first or second finger of a hand. The structure and design of finger operated trigger controls have been such that substantial force and/or stroke length has been required to turn on the air supply to the power tool since the trigger button generally directly actuates the throttle valve controlling air flow to the tool motor. Trigger pull force may be 5 pounds or more and stroke length may be 0.200 inches or more. This has been true for those tools which utilize only an on and off air control and also those controls which have a control which enables one to continuously vary the air flow rate.

For most operators of these tools, the trigger control must be pulled with the distal segment of the first or second finger in order to pull the trigger button with the necessary force over its full stroke length. The combustion of substantial actuating force and/or stroke length can result in a number of problems for the operator due to the stresses on the operating finger. Most common of these problems is the disorder known as "trigger finger", a condition wherein the finger is locked at a right angle at the second joint. Other problems which have resulted include carpal tunnel syndome or tenosynovitis in the wrist and medial or lateral condylitis in the elbow. These stresses are most troublesome for those operators using hand operated air powered tools for long periods, for example, assembly line workers. A solution to this long standing problem has not been found in the art to this point.

It is therefore an object of the present invention to provide a trigger control for a hand operated air powered tool which reduces actuating finger stresses.

It is another object of the present invention to provide a trigger control for an air powered tool which has reduced actuating force.

It is a further object of the present invention to provide a trigger control for an air powered tool which has a short operating stroke.

It is yet another object of the present invention to provide an improved trigger control for an air powered tool which may continuously vary the air flow rate to the tool.

Other objects will be in part obvious and in part pointed out in more detail hereinafter.

A better understanding of the objects, advantages, features, properties and relations of the invention will be obtained from the following detailed description and accompanying drawings which set forth certain illustrative embodiments and are indicative of the various ways in which the principles of the invention are employed.

SUMMARY OF THE INVENTION

The present invention is an air tool trigger comprising a housing having an air inlet adapted for connection to a source of pressurized air and an air outlet for supplying the pressurized air to an air powered motor; a throttle valve in the housing operable between an open and closed position permitting and restricting, respectively, air flow between the inlet and outlet, the throttle valve being biased in a closed position; a piston slidably disposed in a chamber for operating the throttle valve, the piston being movable between an advanced position opening the throttle valve and a retracted position permitting the throttle valve to be biased to the closed position; a pilot valve between the air inlet and the chamber operable between an open position and closed position; air venting means between the chamber and atmosphere to permit limited air flow between the chamber and atmosphere when the pilot valve is in a closed position; and trigger means operably connected to the pilot valve for opening and closing the pilot valve. In an open position the pilot valve permits air flow from a source of pressurized air connected to the air inlet to the chamber to increase the air pressure in the chamber and move the piston to the advanced position, thereby opening the throttle valve and permitting air flow between the inlet and the outlet. In a closed position the pilot valve restricts air flow from the source of pressurized air to the chamber to permit the air venting means to reduce the air pressure in the chamber, thereby permitting the throttle valve to be biased to the closed position.

DETAILED DESCRIPTION OF THE INVENTION

Although the present invention is particularly useful for hand operated air powered tools, and is hereinafter described with reference to a hand operated air power tool, it should be understood that the present invention is useful as a trigger control for fluid powered tools and mechanisms in general.

Figure 1:
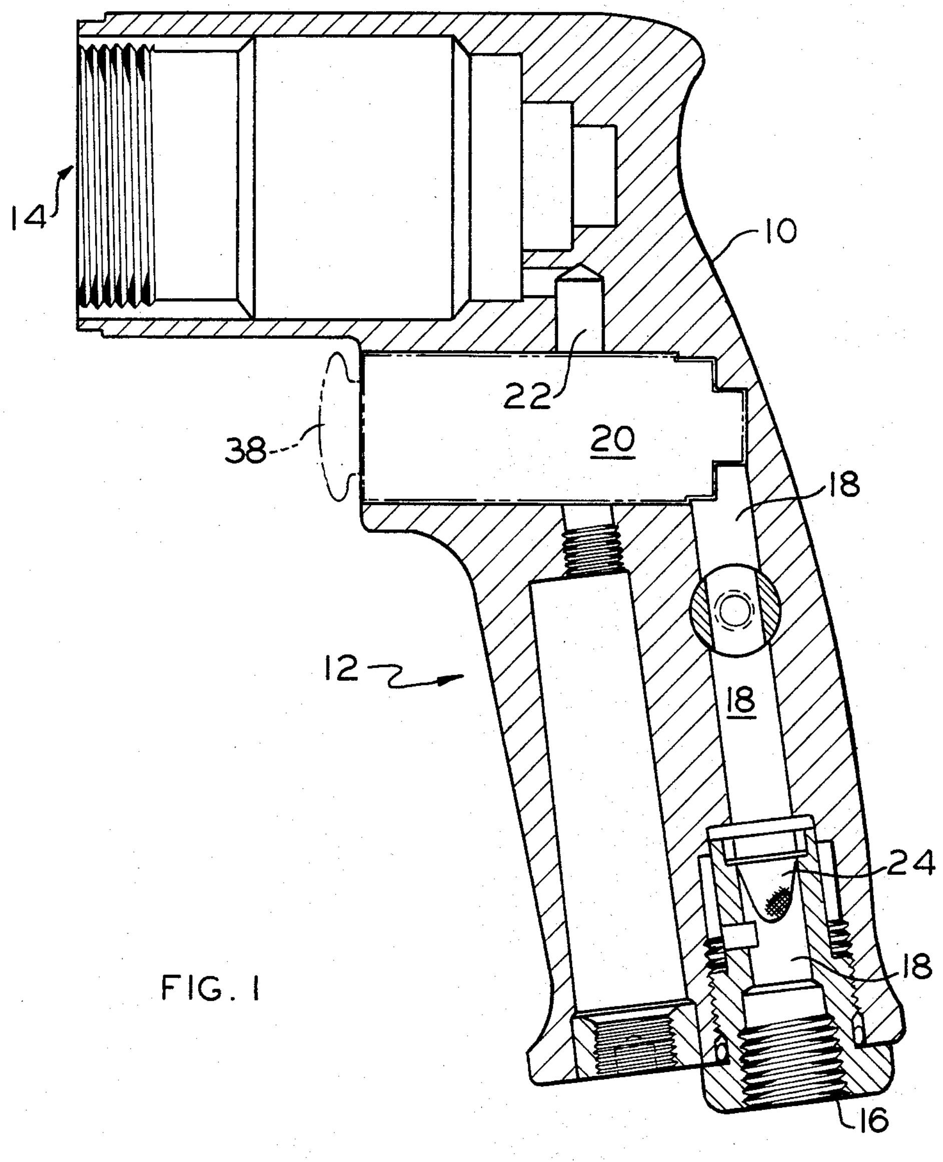
FIG. 1 illustrates the cross section of an air powered tool handle for which the present invention is useful.

A portion of a typical hand operable air powered tool housing is illustrated in cross section in FIG. 1. The lower portion 12 of the housing 10 is a contoured depending pistol grip configured to be grasped by the hand of the operator of the air powered tool. The upper portion 14 of the housing 10 receives an air powered motor, not shown, for operating one or more various types of tools, for example, a fastener setting tool or a drill. The inlet coupling or bushing 16 at the lower end of the housing is adapted to be connected to a source of pressurized or compressed air (not shown). An air inlet chamber 18 connects the air inlet bushing 16 to the trigger mechanism 20. The trigger mechanism 20, finger operable by trigger button 38, controls the air flow passing from air inlet chamber 18 and out of the trigger mechanism to the motor air inlet 22. A filter 24 may be present in inlet chamber 18 to trap any contaminants from the source of compressed air.

Figure 2:
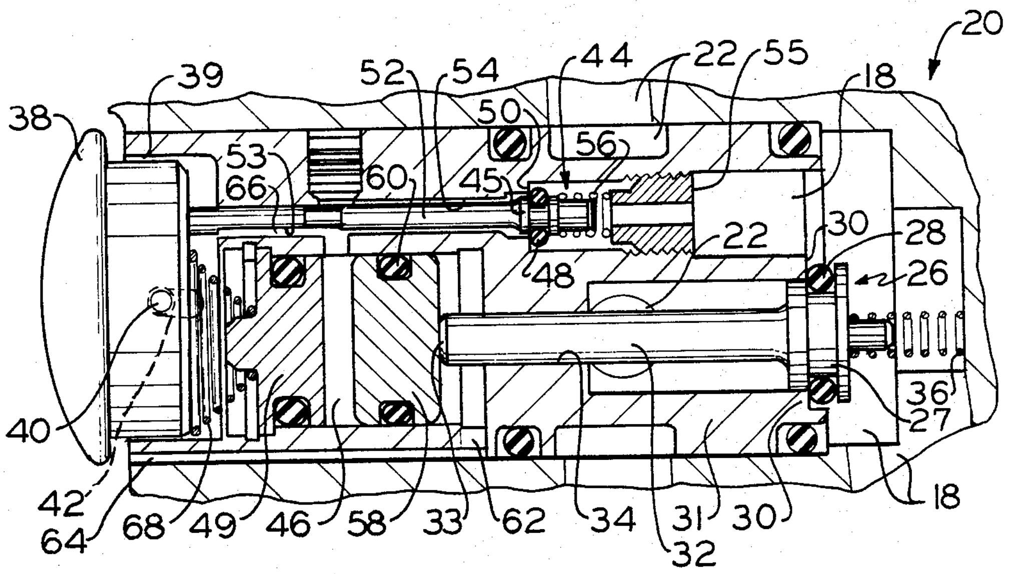
FIG. 2 illustrates the cross section of a first embodiment of the trigger mechanism of the present invention.

In FIG. 2 there is shown a first embodiment of the trigger mechanism of the present invention. A throttle valve 26 connects the air inlet chamber 18 to the motor inlet chamber 22. The throttle valve 26 includes a circular valve member 27 having an "O" ring seal 28 which is shown seated in a complementarily circular throttle valve seat 30 in valve body 31 to restrict and prevent air flow between the air inlet chamber and the motor inlet chamber. The throttle valve member 27 is fixed on throttle valve stem 32 slidable in a valve body bore 34 between a retracted, or closed, position and an advanced, or open, position permitting air flow between the air inlet chamber 18 and the motor inlet chamber 22. The sliding fit between throttle valve stem 32 and bore 34 should be tight enough to substantially prevent any air flow therethrough. The movement of throttle valve member 27 toward and away from the air inlet chamber 18 permits pressurized air in the air inlet chamber 18 to bias the throttle valve 26 in a closed position. A valve closure compression spring 36 mounted between throttle valve member 27 and a wall of chamber 18 may also be employed to bias the throttle valve 26 in a closed position and to ensure that valve member 27 is retracted and closed when an air line is first connected from a source of pressurized air to air inlet bushing 16.

A pilot valve 44 permits communication and controls air flow between the air inlet chamber 18 and cylindrical chamber 46. In this first embodiment, the pilot valve 44 is completely independent of and separate from throttle valve 26. The pilot valve "O" ring seal 48 about the pilot valve member 45 seats in a complementary pilot valve seat 50 in a retracted or closed position, as shown in FIG. 2, to restrict air flow through the pilot valve. The pilot valve member 45 is fixed on pilot valve stem 52 movable in the housing bore 54 from its illustrated retracted position to an advanced position which opens the pilot valve 44 and permits elevated pressure air from the air inlet chamber 18 to pass through the pilot valve and through the annular space between pilot valve stem 52 and the walls of bore 54 into cylindrical chamber 46. As with throttle valve 26, pilot valve 44 is mounted so that pressurized air in the air inlet chamber 18 tends to bias the pilot valve in a closed position. A compression spring 56 may also be utilized between pilot valve member 45 and an annular fitting 55 in chamber 18 to bias the pilot valve closed.

Cylindrical chamber 46 is coaxially disposed adjacent to valve body bore 34 in valve body 31. The end 33 of throttle valve stem 32 extends into chamber 46. A plug 49 seals the end of chamber 46 opposite valve body 31. Piston 58 is slidably mounted inside chamber 46 and supported by said chamber for linearly reciprocating movement therein with O-ring seal 60 between the piston and chamber. Piston 58 is moveable in response to pressurized air introduced into chamber 46 by the opening of pilot valve 44 to open throttle valve 26. Passageway 62 is connected to vent slot 64 to permit trapped air between the piston 58 and valve body 31 to vent to the housing exterior, including any pressurized air which may leak between throttle valve stem 32 and valve body bore 34.

To permit air communication and flow between chamber 46 and the exterior of the handle housing 12 when pilot valve 44 is closed, a flat 53 along pilot valve stem 52 forms a vent passage 66 to atmosphere. Vent passage 66 is closed off upon movement of pilot valve stem 52 to the right towards the pilot valve 44 open position. Air leakage to atmosphere along pilot valve stem 52 when pilot valve 44 is open is negligible.

Extending into the right end of chamber 46, as shown, is the end 33 of throttle valve stem 32. The throttle valve stem end 33 extends into chamber 46 a sufficient distance so that the movement of piston 58 to the right end of chamber 46 will urge the throttle valve stem 32 toward a throttle open position. The piston 58 is not fixed to and is separate from throttle valve stem end 33. When the pilot valve 44 is opened and pressurized air from the air inlet chamber 18 flows into the cylinder 46, the piston 58 is advanced and urged toward the throttle valve stem end 33. So that the biasing force on throttle valve member 27 tending to close throttle valve 26 is exceeded by the force of the elevated pressure air on the piston, the cross section area of the piston 58 in chamber 46 is greater than the cross section of the throttle valve 26 in the air inlet chamber 18. The resulting movement of the piston 58 to the right then forces the throttle valve 26 into an open position thereby permitting pressurized air from inlet 18 to enter the motor air inlet 22. Vent passage 62 permits steady venting to atmosphere of any air to the right of piston 58 inside the chamber 46 which may leak between throttle valve stem 32 and bore 34 and oppose advancement of piston 58. When the pilot valve 44 is closed, vent passage 66 will open to vent chamber 46 and there will be no net force advancing piston 58. Throttle valve 26 will then be biased closed. The movement of throttle valve stem 32 will then retract piston 58 into a position toward the left end of chamber 46.

For positively actuating the pilot valve, a manually operable trigger button 38 is movably secured in the valve body 31 by pin 40 slidable in slot 42. The distance between trigger button 38 and the left end of valve body 31 defines the stroke length of the trigger button 38. The trigger button 38 contacts the pilot valve stem 52 so that, as the trigger button is depressed, pilot valve member 45 is advanced into an open position permitting air flow into cylinder 46. A trigger release compression spring 68 between button 38 and plug 49 may be utilized to bias the trigger button 38 in a direction away from the pilot valve stem 52. The force of the compressed air in the air inlet chamber 18 along with compression spring 56 will then bias the pilot valve 44 into its normally closed position when the trigger button 38 is released. A flat 39 along trigger button 38 provides a path for venting of passageway 66 to atmosphere.

The operation of the embodiment of the trigger mechanism shown in FIG. 2 is as follows: initial connection of a compressed or elevated pressure air supply to the inlet bushing 16 results in a static supply of elevated pressure air in the air inlet chamber 18. The force exerted by this elevated pressure air along with any compression springs which may be utilized tends to bias the throttle valve 26 and the pilot valve 44 in their closed positions.

Upon squeezing the trigger button 38, the pilot valve stem 52 and member 45 will be advanced and the pilot valve 44 will open. Pressurized air from the air inlet chamber 18 will then flow into cylinder 46, thereby causing the piston 58 to advance to the right and contact the end of the throttle valve stem 32. The greater cross sectional area of the piston 58 as compared to the throttle valve 26 will result in a net force to the right, advancing and opening the throttle valve 26. Air will then be permitted to flow from the air inlet chamber 18 through the throttle valve 26 and into the motor air inlet 22, thereby causing the motor to operate.

Upon release of the trigger button 38, the pilot valve 44 will be biased into a closed position, thereby cutting off elevated pressure air flow from the air inlet chamber 18 to the cylinder 46. The opened vent passage 66 of the cylinder 46 will then permit the air pressure inside the cylinder 46 to equalize with the ambient and lower air pressure at the exterior of the handle housing 12. Since there will now be no net force urging the piston 58 toward the throttle valve stem 32, the throttle valve member 27 will then be biased into a retracted position closing the throttle valve 26 and urging the piston 58 to the left into retracted position. With the throttle valve 26 closed, air flow to the motor inlet passage 22 will then be cut off.

In a working prototype of a hand operable air tool incorporating the handle shown in FIG. 1 and the trigger mechanism shown in FIG. 2, the length of the stroke to depress the trigger button and fully open the pilot valve was on the order of 0.040 inches and the force required to depress the trigger button against both the compression spring in the button and the pilot valve was less than one pound.

As can be understood from the aforesaid operating description, the relatively light force and small stroke required to press the trigger button 38 will result in facile and effective control of air flow from an air supply to the motor in the power tool. Unlike prior art air powered tools, the trigger control of the present invention may be easily actuated with the middle segment of the trigger finger since the trigger button manually opens only a small pilot valve and not the main throttle valve controlling air flow to the air tool motor. As a result of the low load and short stroke of the trigger button, stresses on the trigger finger, wrist and elbow are lessened, and the risk of the aforedescribed disorders is significantly reduced.

Figure 3:
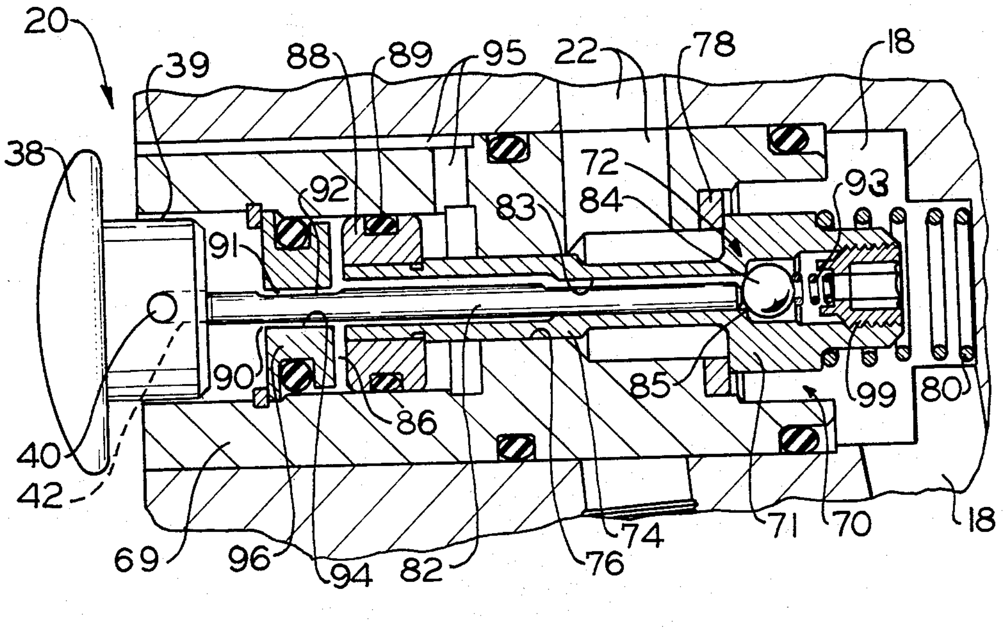
FIG. 3 illustrates the cross section of a second embodiment of the trigger mechanism of the present invention.

In FIG. 3, there is shown a second embodiment of the trigger mechanism of the present invention. While this second embodiment also utilizes a light trigger button load and short stroke to operate an air powered motor, this second embodiment is particularly useful where a variable control of the amount of air flow to the air tool motor is desired.

In the embodiment of FIG. 3 there is again seen an air tool air inlet chamber 18 in communication with and leading to both a throttle valve 70 and a pilot valve 72. Throttle valve 70 controls air flow between air inlet chamber 18 and motor inlet 22. However, unlike the embodiment of FIG. 2, the throttle valve in this embodiment is servo operated.

The throttle valve 70 includes a throttle valve member 71 integrally mounted on a throttle valve stem 74 which is slidably disposed in a bore 76 of valve body 69. As in the previous embodiment, the fit between stem 74 and bore 76 should minimize air flow therebetween. The circular throttle valve member 71 is normally biased in a closed position due to the force of the elevated pressure air in the air inlet chamber 18 urging the throttle valve member 71 toward the circular elastomeric throttle valve seat 78 in valve body 69. An additional valve closure spring 80 between valve member 71 and a wall of chamber 18 may be utilized to bias the throttle valve 70 in the closed position.

The pilot valve 72 is mounted coaxially in the throttle valve 70 and provides for servo operation of the throttle valve 70. A pilot valve stem 82 is slidably disposed in a larger diameter bore 83 coaxially extending through the throttle valve stem 74 and communicating with air inlet chamber 18. The pilot valve stem 82 is operable by the trigger button 38 to move a spherical nylon pilot valve ball plug 84 out of closed sealing engagement in a circular pilot valve opening 85 at the end of bore 83. When opened, the pilot valve 72 permits air to pass from the air inlet chamber 18 through opening 85 and along a passageway defined by the gap between pilot valve stem 82 and bore 83 and into a cylindrical chamber 86 formed within valve body 69 in coaxially surrounding relation to throttle valve 70.

An annular piston 88 is slidably disposed in chamber 86 and sealed therewith by "O" ring seal 89. Piston 88 is coaxially mounted to the end of throttle valve stem 74 which extends into chamber 86 opposite throttle valve member 71. An annular plug 96 closes the end of chamber 86 opposite the end leading to throttle valve bore 76. Pilot valve stem 82 passes through the opening 94 in plug 96. A vent passage 90, defined by a small diametral clearance between pilot valve stem 82 and the central opening 94 in plug 96, permits air to pass from the chamber 86 through the vent passage 90, and around flat 39 between the trigger button 38 and housing 12 to atmosphere. The vent passage 90 from the chamber 86 to the exterior of the housing 12 has a smaller cross sectional area than the maximum pilot valve opening at 85. While vent passage 90 provides constant venting or bleeding of air from chamber 86, the larger area of the pilot valve permits the air pressure in chamber 86 to be raised when pilot valve 72 is opened.

Flat 92 on pilot valve stem 82 provides an additional larger vent passage 91 to augment vent passage 90 when the pilot valve stem 82 is in the fully retracted position toward the left as shown. This passage 91 is closed once pilot valve stem 82 is advanced toward the right to open pilot valve 72.

As with the embodiment in FIG. 2, the piston 88 in the embodiment in FIG. 3 has a cross sectional area exposed to chamber 86 which is greater than that of the throttle valve member 71 in air inlet chamber 18. When the pilot valve 72 is opened and pressurized air from the air inlet chamber 18 passes through valve bore 83 and enters chamber 86 there is a net force on the piston 88 in the direction to advance and open the throttle valve 70. Passageway 95 leading from the portion of chamber 86 between piston 88 and throttle valve 72 to the exterior of housing 12 permits trapped air to vent to the atmosphere, including air which may leak between throttle valve stem 74 and the surface defining bore 76 in valve body 69.

The spherical nylon ball plug 84 of the pilot valve is normally biased by elevated air pressure in the air inlet chamber 18 into a closed position. A valve closure compression spring 93 between plug 84 and an annular fitting 99 in the end of throttle valve member 71 leading to chamber 18 may also be utilized to bias the pilot valve 72 in the closed position.

The trigger button 38 is slidably mounted by a pin 40 in a slot 42 in valve body 69. As with the previous embodiment, the distance between button 38 and the left end of valve body 69 defines the length of the stroke of the trigger. The trigger button 38 contacts the end of the pilot valve stem 82 and as the trigger button 38 is depressed, the pilot valve stem 82 is advanced tending to open the pilot valve 72. Additional biasing means such as a compression spring (not shown) may be utilized to bias the trigger button in a released position.

The operation of the trigger mechanism shown in FIG. 3 is as follows: upon depressing the trigger button 38, for example, to a fixed intermediate distance less than the full stroke, passage 91 is closed, and the pilot valve stem 82 urges plug 84 from pilot valve opening 85 and opens the pilot valve 72 thereby permitting elevated pressure air to pass from air inlet 18 into the chamber 86. The net force of pressurized air on the piston 88 moves it to the right as shown, thereby advancing the throttle valve stem 74 and opening the throttle valve 70 to permit air to flow through motor air inlet 22 to the air tool motor.

Movement of the throttle valve 70 toward an open position, however, causes the pilot valve 72 to close somewhat, thereby lessening the air pressure in cylinder 86 on the piston 88 because of the steady venting of cylinder 86 air pressure through the small diametral vent passage 90. As the total force of the chamber 86 air pressure on piston 88 is diminished, the steady force of elevated air pressure in air inlet chamber 18 on throttle valve member 71 causes the throttle valve member 71 and stem 74 to move to the left towards a closed throttle valve position. With the trigger button 38 still depressed in its fixed intermediate stroke position, movement of the throttle valve member 71 to the left has the effect of further opening pilot valve 72 and again increasing the air flow to and air pressure in chamber 86.

The dynamic characteristics of the trigger control mechanism, including the mass and friction of moving components, are such that the mechanism statilizes. The throttle valve member 71 seeks an equilibrium or steady state position beween closing the throttle valve member 71 and closing the pilot valve 72, thereby permitting a steady controlled quantity of air to flow from the inlet air chamber 18 to the motor inlet chamber 22.

Depressing the trigger button 38 a further incremental distance opens the pilot valve 72 to a greater degree, thereby causing the throttle valve 70 to again open further and seek an equilibrium position admitting air at a higher flow rate to the motor inlet 22. Depressing the trigger button to the full extent opens the pilot valve 72 and throttle valve 70 to permit the maximum amount of air flow from the air inlet chamber 18 to the motor inlet chamber 22.

When the trigger button 38 is released slightly from any given position and pilot valve 72 is closed slightly by its biasing force, the steady bleeding or venting of chamber 86 air through the vent passage 90 permits the pressure in the chamber 86 to be lowered somewhat, thereby allowing the throttle valve 70 to move towards its closed position by the bias of the compression spring 80 and the air pressure in the air inlet chamber 18. The flat 92 on the portion of pilot valve stem 82 passing through plug bore 94 provides passage 91 to augment the vent passage 90 cross sectional area when the trigger button 38 is fully released. This will increase the rate at which the throttle valve 70 closes.

Thus, it can be seen that for each small change in the trigger button position there is an exact and corresponding small change in throttle valve position, thereby permitting a feathering of air flow control to the motor and a corresponding feathering of motor RPM. This second embodiment provides for greater variability in control of air flow than that provided by the aforedescribed first embodiment. This control feature is a result of the precise balancing of forces on the throttle valve by the pilot valve mounted thereon.

A working prototype of an air powered tool utilizing the trigger mechanism shown in FIG. 3 was constructed. The force required to depress the trigger button was less than one pound and the total stroke was approximately 0.060 inches. While this stroke length is somewhat longer than the stroke length of the prototype of the first embodiment of the trigger mechanism, this longer stroke length was desirable to provide a better "feel" for the operator to continuously vary the air flow rate into the motor.

Unlike prior art trigger control mechanisms which generally connect the trigger button directly to a variable flow throttle valve, the trigger button of this second embodiment is connected directly to only a pilot valve. Since the pilot valve controls a much smaller flow of air than does the throttle valve, the force and stroke required to actuate the pilot valve is much lower. As with the first embodiment, the trigger mechanism of FIG. 3 enables the trigger button to be easily depressed with the middle segment of the operator's trigger finger, thus reducing the stresses thereon and providing the benefits previously discussed.

The embodiment of the present invention disclosed herein may thus be advantageously employed to provide, for example, either an on/off air flow control utilizing the embodiment of FIG. 2 or a more continuously variable air flow control utilizing the embodiment of FIG. 3.

As will be apparent to persons skilled in the art, various modifications, adaptations and variations of the foregoing specific disclosures can be made without departing from the spirit and scope of this invention.

Having thus described the invention what is claimed is:

1. A trigger control for a fluid operated tool comprising:

a housing having an inlet connected to a source of pressurized fluid and an outlet for supplying that pressurized fluid to a fluid powered motor;

a throttle valve received in a first chamber in the housing and reciprocable between open and closed positions, the throttle valve being biased toward its closed position by the pressurized fluid in the first chamber applying a fluid force on one end of the throttle valve;

a piston at an opposite end of the throttle valve, the piston being supported in a second chamber in the housing for linear reciprocating movement for adjusting throttle valve position;

a pilot valve supported within the first chamber of the housing for movement between open and closed positions for controlling piston position, the pilot valve in open position permitting fluid flow from the source of pressurized fluid to the second chamber to increase fluid pressure in the second chamber and apply a fluid force on the piston at said opposite end of the throttle valve to move it to open position and permit fluid flow between the inlet and outlet, the pilot valve in closed position being engaged with said one end of the throttle valve;

fluid venting means between the second chamber and atmosphere to permit fluid flow between the second chamber and atmosphere when the pilot valve is in closed position;

biasing means continuously urging said pilot valve into closed position wherein fluid flow from the source of pressurized fluid to the second chamber is restricted to permit the fluid venting means to reduce the fluid pressure in the second chamber and permit the throttle valve to be biased into closed position; and trigger means reciprocably mounted in the housing independently of the pilot valve for moving it against its biasing means relative to the throttle valve for adjusting the pilot valve between its closed and open positions, the pilot valve being movable relative to the trigger means, the throttle valve being continuously and instantly responsive to and automatically adjustable to variable pilot valve positioning by continuously seeking a balanced condition of fluid forces on opposite ends of the throttle valve, feathering fluid flow to the outlet.

2. The trigger control of claim 1 wherein said throttle valve and said piston are coaxially aligned.

3. The trigger control of claim 2 wherein said throttle valve, said piston, and said pilot valve are coaxially aligned, the pilot valve biasing means being mounted in the first chamber of the housing.

4. The trigger control of claim 1 wherein said piston is attached to said throttle valve.

5. The trigger control of claim 1 wherein said venting means includes a vent passage establishing continuous communication between said second chamber and the atmosphere, said vent passage having a smaller cross sectional area than said pilot valve at the pilot valve full open position.

* * * * *